Nov. 11, 1952 — G. H. ENNIS ET AL — 2,617,299
APPARATUS FOR MEASURING OIL AND WATER PRODUCTION OF WELLS
Filed Dec. 27, 1946
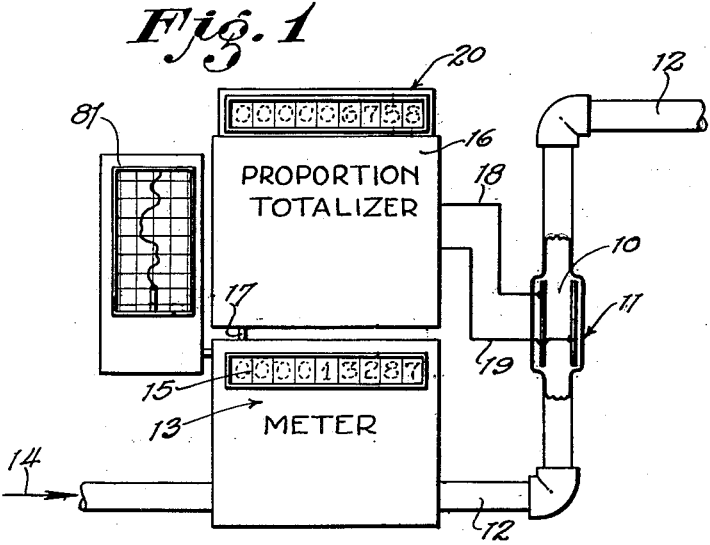
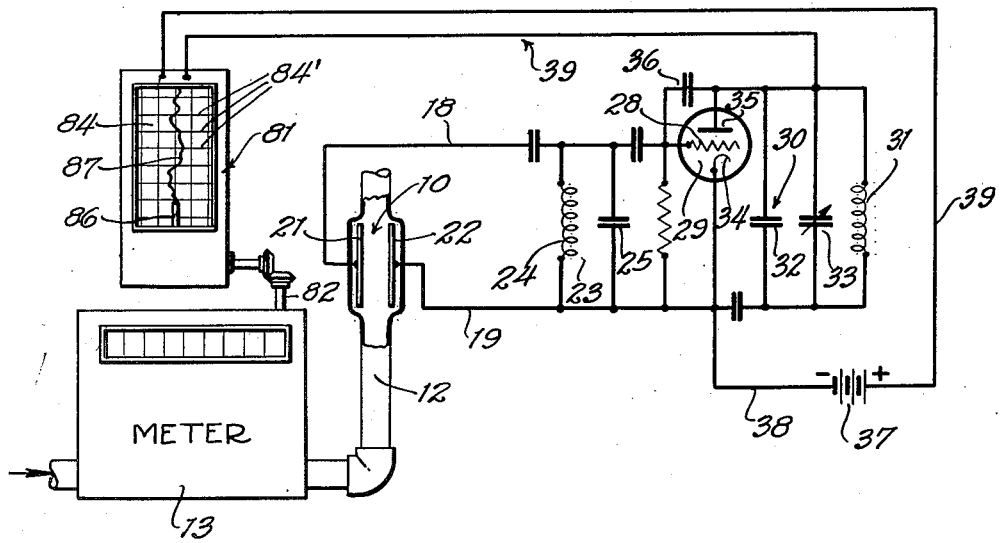
INVENTORS,
GEORGE H. ENNIS &
WILLIAM WALTER ENNIS
ATTORNEY.

Patented Nov. 11, 1952

2,617,299

UNITED STATES PATENT OFFICE 2,617,299

APPARATUS FOR MEASURING OIL AND WATER PRODUCTION OF WELLS

George Henry Ennis and William Walter Ennis, Long Beach, Calif.; said William Walter Ennis assignor to Robert V. Funk, Long Beach, Calif.; Julia F. Ennis, executrix of said George Henry Ennis, deceased Application December 27, 1946, Serial No. 718,714

8 Claims. (Cl. 73—194)

Our invention relates to apparatus for determining the amount of water contained in the production fluid obtained from oil wells.

The production from oil wells often includes water which is combined with the oil in the form of an emulsion, is in the form of drops of water, mixed with the oil, or in the form of relatively large bodies or slugs of water.

It is an object of the invention to provide apparatus for continuously determining the proportion and/or quantity of water contained with the oil comprising the production of an oil well. A feature of the present invention is that the production fluid of a well or group of wells is conducted through a measuring position or station wherein the flow is measured so as to measure consecutive portions of the flow. For example, the measurement may be in gallons or barrels and as the oil flows through the meter, the passage of each consecutive measured unit of production fluid will be indicated by a recording device or register. In conjunction with the measuring means there is a means responsive to the amounts or proportions of oil and/or water in the production fluid for recording the proportion of water and/or oil in each consecutive measured part of the flow of production fluid. In the practice of the invention the proportional values are integrated with the measurements of flow or quantity, whereby it is possible to instantly obtain knowledge of the respective proportions or amounts of water and oil in the entire flow of production fluid which has passed through the measuring station or zone of the invention.

Sometimes the measure of the amount or "cut" of water in the production from a well is approximated by allowing the production to stand in a tank for a period of time expected to result in settlement of all the water to the bottom of the tank, then measuring the respective heights of the oil and water bodies in the tank and computing the volumes thereof. This method is not accurate for the reason that there is quite often at the bottom of the oil body a layer of oil-water emulsion containing a large quantity of water. In some instances the production from several wells are pumped into a single storage tank, and, in order to obtain knowledge of the proportionate productions of the different wells, it is customary to periodically take samples from the respective production delivery lines leading to the tank and compute the proportions of oil and water in these periodic samples, and to use these computations as a means for determining the total amount of oil pumped from each well into the common storage tank. This method is far from accurate for the reason that at the time a sample of production from a well is taken, an abnormal condition may exist. That is to say, at the time the sample is taken there may be an excessive amount of either oil or water in the production, so that the sample would not be representative of the production flow during intervening periods of time. By use of our present invention, it is possible to quite accurately measure the cut of water and/or oil in the production stream and to make a continuous record of the same which may be noted at specified intervals.

It is an object of the invention to provide apparatus for obtaining knowledge of the proportion or amount of water and/or oil in the production from a well or wells, wherein relative movement of a device or element sensitive to the actual amounts or proportions of oil and/or water in the production is produced and simultaneously therewith a measure of a magnitude of the production is made, this measure of magnitude being mathematically combined or integrated with the proportional values so as to obtain a final result which will show the amount and/or proportion of water and/or oil in the production.

Further objects and advantages of the invention will be brought out in the following part of the specification, wherein detailed explanation has been employed for the purpose of fully disclosing preferred embodiments of the invention without placing limitation on the scope thereof expressed in the appended claims.

Referring to the drawings which are for illustrative purposes only:

Fig. 1 is a schematic view showing a preferred form of our invention;

Fig. 3 is a schematic or diagrammatic view showing an alternative form of our invention.

Figure 2:
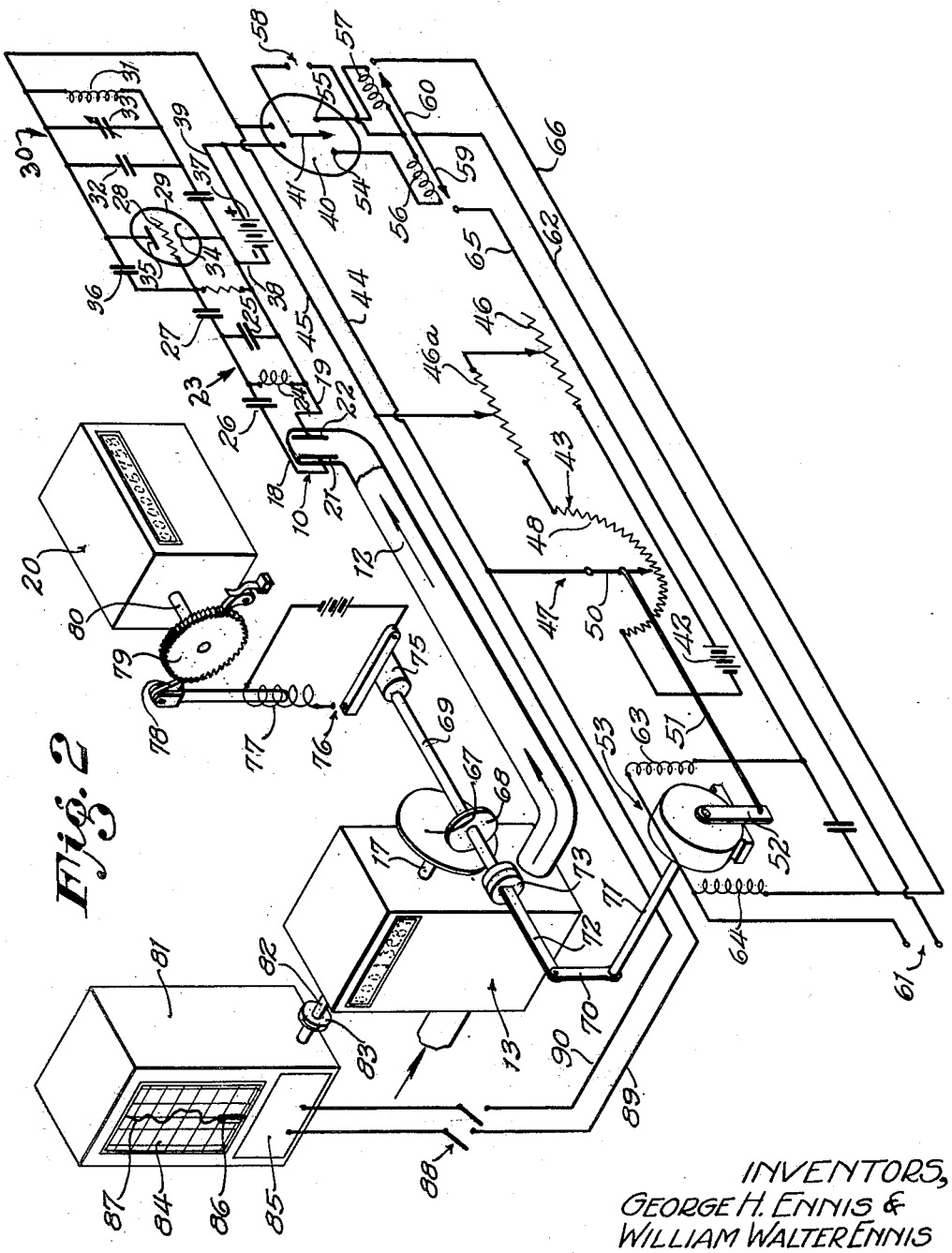
Fig. 2 is a diagrammatic view of certain electrical and mechanical parts of the device shown in Fig. 1.

In Fig. 1 we show a means 10 which is responsive or sensitive to the proportionate values of liquids in a composition of liquids, for example, the oil and water comprising the production fluid from an oil well. Relative movement of the production fluids and the sensitive device 10 is accomplished by placing the sensitive device in a chamber 11 and conducting the production of the well through the zone or measuring station formed by the chamber 11, piping 12 being connected to spaced openings of the chamber 11 for this purpose. For measuring the relative movement of the production and the sensitive device, a meter 13 is provided which measures the consecutive portions of the water and oil production which passes in the direction indicated by the arrow 14 from a well. This meter 13 has recording means such as a mechanical counting device 15 for showing the number of units of the oil and water production which have passed through the meter. An effect, representative or proportionate to the quantities of fluid passing through the meter, is transmitted to a proportion totalizer 16. For this purpose we have shown a shaft 17 connecting the devices 13 and 16. The rate of rotation of this shaft 17 conforms to the flow of fluid through the meter 13. The proportion totalizer 16 is electrically connected to the sensitive device 10 by conductors 18 and 19. The proportion totalizer 16 inclues a register 20 operated so as to constantly show the amount of one of the liquids, for example, oil or water, which has passed through the meter 13. In the form of the invention shown, the amount displayed by the register 20 is the water cut of the production fluids passing through the piping 12. To obtain the amount of oil in this quantity of production fluid which has passed through the meter 13, the reading of the register 20 is subtracted from the reading of the register 15. By use of the equipment shown in Fig. 1, it is possible to have knowledge at all times of oil or water which has passed through the meter.

In Fig. 2 we show all of the elements of the proportion totalizer 16 and the manner in which they cooperate with the remaining parts disclosed in Fig. 1. The sensing device 10 comprises a capacitor consisting of plates or electrodes 21 and 22 which may be of flattened, curved or cylindrical form, as desired, with a dielectric between the electrodes 21 and 22 consisting of the production fluid (oil and water in varying proportions).

The conductors 18 and 19 connect the condenser plates 21 and 22 to an oscillating circuit 23 comprising an inductance 24 and a capacitance 25, this oscillating circuit 23 being connected through a capacitance 26 with the conductor 18 and through a capacitance 27 with the grid 28 of a triode thermionic tube 29. The oscillating circuit 23 is coupled to an oscillating circuit 30 consisting of an inductance 31, a fixed capacitance 32 and a variable capacitance 33. The oscillating circuit 30 is bridged across the cathode 34 and the plate 35 of the tube 29 and the circuits 23 and 30 are capacitance coupled by a capacitance 36 connected across the plate 35 and the grid 28. The oscillator comprising the oscillating circuits and the tube 29 are fed by a battery 37 through conductors 38 and 39, the conductor 39 being connected to a galvanometric switch 40 having a pointer or switch lever 41 which swings rightwardly or leftwardly from the centralized position in which it is shown in response to variations in the direct cathode-plate current of the oscillator. The current of the oscillator, which tends to actuate the switch so as to move the pointer 41 thereof in one direction, is bucked by a current derived from a battery 42 and a voltage divider 43 bridged across the terminals of the galvanometric switch 40 by conductors 44 and 45. For adjusting purposes, the voltage divider 43 includes resistances 46 and 46a, as shown, and includes a potentiometer 47 having an elongated resistor 48 and a movable contactor 50 connected by a link 51 with an arm 52 adapted to be moved back and forth by a reversible motor 53 controlled by the switch 40.

The swinging arm or pointer 41 of the switch 40 is disposed between contacts 54 and 55 connected to the outer ends of electromagnets 56 and 57, the inner ends of these electromagnets 56 and 57 being connected in series with the arm 41 through a source of electrical energy 58. The electromagnets 56 and 57 are arranged to actuate relays 59 and 60 connected to a source of electrical energy 61 for operating the motor 53, through a common conductor 62, and to the windings 63 and 64 of the motor 53 through conductors 65 and 66.

A rise or fall in the electrical characteristics present in the conductor 39 will cause the arm 41 to swing to the right or to the left. One or the other of the contacts 54, 55 will be engaged and the motor 53 will be operated in a direction to accomplish movement of the contactor 50 in a direction to bring the bucking circuit into balanced relation to the cathode-plate circuit of the tube 29, thereby bringing the arm 41 back into neutral or intermediate position. Therefore, the movement of the contactor 50 is proportionate to the changes in the circuit 39, and the position of the contactor 50 at any time indicates the strength of current flow in the conductor 39 which in turn is proportionate to or representative of the reactance of the sensing device 10 which depends upon the apparent dielectric constant of the aggregate of oil and water between the plates 21 and 22.

The invention provides means for utilizing the movement of the arm 50 to control the operation of the register 20 which is arranged to indicate the measure of the water which has passed through the piping 12. In the specific mechanism employed for this purpose, the shaft 17 which extends from the meter 13 into the proportion totalizer 16 drives a disc 67 engaged by the periphery of a disc 68 mounted on a shaft 69 disposed in transverse relation to the axis of the shaft 17. The shaft 69 may be shifted axially so that the disc 68 may be adjusted across the surface of the disc 67, thereby providing a variable drive for the reason that when the disc 68 engages the exact center of the disc 67, rotation of the disc 67 will not drive the disc 68, and that as the disc 68 is adjusted away from the center of the disc 67, the proportionate speed at which the disc 68 will be driven by the disc 67 will be increased from zero to maximum. To shift the disc 68 across the surface of the disc 67, a lever 70 is provided fixed on a shaft 71 which extends from the motor 53, the rotation of the shaft 71 and the swinging of the lever 70 being proportionate to the swinging of the arm 52, which in turn moves the contactor 50. The arm 70 is connected through a link 72 and a swivel connection 73 with the shaft 69 to move the shaft 69 axially and thereby adjust the disk 68 on the surface of the disc 67 in such a manner that the speed of rotation of the disc 68 will be in proportion to the speed of rotation of the shaft 17, conforming to the existing position of the contactor 50 which is in turn determined by the instant apparent dielectric constant of the aggregate fluid between the condenser plates 21 and 22. Likewise, in the specific equipment, the parts are so proportioned that one rotation of the disc 68 represents one gallon of water passing through the piping 12. A cam 75 fixed on the shaft 69 closes a switch 76 each time the disc 68 rotates, thereby energizing a solenoid 77 which moves a pawl 78 downward so as to rotate a ratchet 79 one tooth. This ratchet 79 is mounted on the drive shaft 80 of the register 20, and the ratchet 79 has forty-two teeth so that forty-two revolutions of the disc 68 will produce one revolution of the ratchet wheel 79 to cause the dial of the register 20 to register one barrel.

In the operation of the device shown in Fig. 2, the meter 13 is driven by the aggregate fluid which passes through the piping 12 and the rotation of the disc 67 is representative or constitutes a comparative measurement of the aggregate fluid moving through the piping 12. The electrical equipment described with relation to Fig. 2 automatically adjusts the disc 68 in such position with relation to the disc 67 that its rotation will be a proportion to the rotation of the disc 67 equal to the instant proportion of water and oil sensed or indicated by the apparent dielectric constant of the fluid aggregate between the plates 21 and 22. Accordingly, each rotation of the disc 67, representing the passage of one gallon of fluid aggregate through the piping 12 will be accompanied by a proportionate rotation of the disc 68 representative of the amount of water in the measured aggregate fluid. The position of the disc 68 will be varied by the action of the electrical equipment in accordance with the variations in the proportions of water, or water cut, in the well production fluid or aggregate which passes through the piping 12.

A recording meter 81 is connected to the meter 13 by a shaft 82 having a clutch 83. This recording meter has therein a mechanism, driven by the shaft 82, for moving a record strip 84 through distances which are proportional to the quantities of aggregate fluid measured by the meter 13. The recording meter 81 includes an electrical meter 85 having a stylus 86 for inscribing a line 87 on the record strip 84 which indicates the instant proportion of water and oil passing through the piping 12. The electrical meter 85 is connected by switch means 88 and conductors 89 and 90 with the conductors 45 and 44 of the bucking circuit. Since the current flowing through the conductors 44 and 45 varies in accordance with the variations of capacitance across the plates 21 and 22, the switch means 88 may be closed and the clutch 83 engaged so as to actuate the recording meter when desired, thereby forming a record 87 on the recording strip 84, which may be integrated with relation to the record of the gallons of aggregate fluid passed through the meter 13 to check against the reading obtained from the dial of the recorder 20. In this way, it is possible to check the accuracy of the totalizing mechanism which actuates the recorder or register 20.

As shown in Fig. 3, one form of the invention avoids the totalizer and employs the recording meter 81 in its place. Those parts shown in Fig. 3 which have been previously shown and described, have been identified by the same numerals so as to avoid the necessity of repeating detailed description. Herein, a shaft 82 extended from the meter 13, drives the recording meter 81 so as to move a recording strip 84 through linear distances which represent gallons or barrels of aggregate flow through the meter 13. The strip 84 moves vertically upwardly and the transverse lines 84' thereon may represent ten barrels of aggregate fluid measured by the meter 13. The electro-responsive parts of the recording meter 81 are connected in series with the conductor 39 and the cooperating parts of the equipment are adjusted so that when the proportion of water in the aggregate fluid flowing through the pipe 12 is 50%, the stylus 86 will be positioned centrally with relation to the vertical sides of the strip 84. As the proportion of water in the aggregate fluid varies, the stylus will move proportionately, in lateral direction, and the position of the line 87, inscribed by the stylus 86, with relation to the width of the strip 84, will indicate the instant proportion of water and/or oil in the aggregate fluid. That is to say, the lateral dimension between the left hand side of the sheet and the line 87, may indicate the proportion of water and the lateral dimension between the line 87 and the right hand side of the sheet may indicate the proportion of oil in the aggregate fluid. These proportions, indicated by the line 87, may be integrated with the magnitude values indicated by the spacing between the lateral lines 84' which have been traversed by the stylus 86 so as to determine the amounts or proportions of water and oil in the measured aggregate flow.

We claim as our invention:

1. In apparatus for continuously determining the amount or proportion of an aqueous substance and/or an oleaginous substance in an aggregate of such substances, comprising: means defining a flow path for a stream of said aggregate; volume measuring means in said path and operated by aggregate flowing along said path for measuring the amount of said aggregate of said stream, operation of said volume measuring means providing a usable operating force; proportion measuring means, including proportion sensing means comprising capacitor means at a station along said path for sensing the proportion of one of said substances in said aggregate, and electrical means coupled with said capacitor means and controlled thereby so that current in said electrical means varies in magnitude with variations in the proportion of said one substance; means for registering the amount of one of said substances in said aggregate, said means having a movable operating member; and means for operating said operating member, said means including parts responsive to said force of the volume measuring means and said current of the electrical means so that variations in the magnitude of said current will modify the operation of said member.

2. In apparatus for determining the amount or proportion of an aqueous substance and/or an oleaginous substance in an aggregate of such substances, comprising: flow path defining means for guiding a stream of said aggregate; volume measuring means for measuring the amount of aggregate passing along said flow path; proportion sensing means, including capacitor means contiguous to said stream for sensing the proportion of one of said substances in said aggregate, and electrical means connected with said capacitor means and controlled thereby so that current in said electrical means varies in magnitude with variations in the proportion of said one substance of said aggregate; means, including cooperating parts respectively connected with said volume measuring means and said electrical means, said parts being operable in accordance with the operation of said volume measuring means and the magnitudes of said electrical means so that the resultant is a measure of one of said substances; and means for recording said resultant.

3. In apparatus for determining the amount or proportion of an aqueous substance and/or an oleaginous substance in an aggregate of such substances, comprising: flow path defining means for guiding a stream of said aggregate; volume measuring means for measuring the amount of aggregate flow; proportion sensing means, including capacitor means contiguous to said stream for sensing the proportion of at least one of said substances in said aggregate, and electrical means connected with said capacitor means and controlled thereby so that current in said electrical means varies in magnitude with variations in the proportion of said one substance of said aggregate; proportion recording means having a movable member; and operating means for said recording means, said recording means including parts respectively connected with said volume measuring means and said electrical means, said parts being operable in accordance with the operation of said volume measuring means and the magnitudes of said electrical means and cooperating with each other to effect operation of said movable member in such a manner that the recording means records the amount of one of said substances.

4. In apparatus for continuously determining the amount or proportion of an aqueous substance and/or an oleaginous substance in an aggregate of such substances, comprising: means defining a flow path for a stream of said aggregate; volume measuring means for measuring the amount of aggregate flowing along said path and having mechanism operated by said aggregate flow; proportion measuring means, including proportion sensing means comprising capacitor means at a station along said path for sensing the proportion of one of said substances in said aggregate, and electrical means coupled with said capacitor means and controlled thereby so that current in said electrical means varies in magnitude with variations in the proportion of said one substance comprising the aggregate; means for registering the proportion of one of said substances of said aggregate; operating means for said registering means, said operating means being connected with the volume measuring means so that operation of said volume measuring means by aggregate flow will cause operation of said registering means; and means for modifying the action of said operating means in accordance with the magnitude of the current of said electrical means.

5. In apparatus for continuously determining the amount or proportion of an aqueous substance and/or an oleaginous substance in an aggregate of such substances, comprising: means defining a flow path for a stream of said aggregate; volume measuring means for measuring the amount of aggregate flowing along said path; proportion measuring means, including proportion sensing means comprising capacitor means at a station along said path for sensing the proportion of one of said substances in said aggregate, and electrical means coupled with said capacitor means and controlled thereby so that current in said electrical means varies in magnitude with variations in the proportion of said one substance comprising the aggregate; means for registering the proportion of one of said substances of said aggregate; operating means for said registering means, said operating means being connected with the volume measuring means so that operation of said volume measuring means in accordance with aggregate flow will cause operation of said registering means; and means for modifying the action of said operating means in accordance with the magnitude of the current of said electrical means.

6. In apparatus for continuously determining the amount or proportion of an aqueous substance and/or an oleaginous substance in an aggregate of such substances, comprising: proportion recording means including a rotatable operating member; means for actuating said rotatable member comprising, volume measuring means for measuring the gross volume of a moving stream of said aggregate, and proportion measuring means including electrical means having a part wherein the magnitude of the current is varied in accordance with the proportion of one of the substances of said aggregate; and variable driving means for said rotatable member including means responsive to the operation of said volume measuring means and means responsive to variations in the magnitude of the current in said part of the electrical means.

7. In apparatus for continuously determining the amount or proportion of an aqueous substance and/or an oleaginous substance in an aggregate comprising such substances: volume measuring means for measuring an amount of said aggregate passed through said measuring means; proportion measuring means, including proportion sensing means comprising capacitor means in sensing relation to said amount of aggregate for sensing the proportion of one of said substances in said aggregate, and electrical means coupled with said capacitor means and controlled thereby so that current in a portion of said electrical means varies in magnitude with variations in the proportion of said one substance comprising the aggregate; means for registering the proportion of one of said substances of said aggregate; operating means for said registering means, said operating means being connected with the volume measuring means so that operation of said volume measuring means by aggregate flow therethrough will cause operation of said registering means; and means for modifying the action of said operating means in accordance with the magnitude of the current of said electrical means.

8. In apparatus for continuously determining the amount or proportion of an aqueous substance and/or an oleaginous substance in an aggregate comprising such substances: volume measuring means for measuring an amount of said aggregate passed through said measuring means; means for recording the amount of aggregate measured by said volume measuring means; proportion measuring means, including proportion sensing means comprising capacitor means in sensing relation to said amount of aggregate for sensing the proportion of one of said substances in said aggregate, and electrical means coupled with said capacitor means and controlled thereby so that current in a portion of said electrical means varies in magnitude with variations in the proportion of said one substance comprising the aggregate; means for registering the proportion of one of said substances of said aggregate; operating means for said registering means, said operating means being connected with the volume measuring means so that operation of said volume measuring means by aggregate flow therethrough will cause operation of said registering means; and means for modifying the action of said operating means in accordance with the magnitude of the current of said electrical means.

GEORGE HENRY ENNIS.
WILLIAM WALTER ENNIS.

REFERENCES CITED

The following references are of record in the file of this patent:

UNITED STATES PATENTS

| Number | Name | Date |
|---|---|---|
| 1,944,587 | Young | Jan. 23, 1934 |
| 1,976,904 | Terman | Oct. 16, 1934 |
| 2,082,213 | O'Donnell | June 1, 1937 |
| 2,222,551 | Ziebolz et al. | Nov. 19, 1940 |
| 2,296,867 | Osborne | Sept. 29, 1942 |